CONTROL APPARATUS

Filed Dec. 28, 1961

INVENTOR.

JOHN W. LUEBBE, Jr.
ROBERT H. BREEDLOVE, DECEASED
By SHIRLEY S. BREEDLOVE, ADMINISTRATRIX

By Roger W. Jensen
ATTORNEY.

United States Patent Office 3,229,263

Patented Jan. 11, 1966

3,229,263

CONTROL APPARATUS

John W. Luebbe, Jr., Clearwater, Fla., and Robert H. Breedlove, deceased, late of Clearwater, Fla., by Shirley S. Breedlove, heir, Mobile, Ala., assignors to Honeywell Inc., a corporation of Delaware Filed Dec. 28, 1961, Ser. No. 164,216
7 Claims. (Cl. 340—174)

This invention relates to control apparatus and more particularly to computer memory circuits operating in a nondestructive readout mode.

Nondestructive readout memory techniques are well known in the art, and a discussion of this type of memory can be found in an article entitled "Fluxlok—A Nondestructive, Random-Access Electrically Alterable, High-Speed Memory Technique Using Standard Ferrite Memory Cores," by Robert M. Tillman, in the September 1960 issue of the IRE Transactions on Electronic Computers.

This invention comprises, in a broad sense, a computer memory having a plurality of storage units, each of the storage units comprising a plurality of nondestructive readout magnetic devices, such as a magnetic core constructed to operate in the nondestructive readout mode. The various storage units each may be designated as a memory word, with each bit of the word being represented by one of the nondestructive readout magnetic devices.

One of the memory storage units is reserved as a reference word and each of the nondestructive storage devices of the reference word are permanently set to the same magnetic state, either storing all binary 1's or all binary 0's.

Separate interrogate windings are connected to the magnetic devices of each memory word and the reference word, and are connected so that the reference word and any selected one of the memory words may be simultaneously interrogated.

Separate sense, or readout, windings are connected to all the like order magnetic devices in the memory words and the reference word, and the output of each of the sense windings are connected to a read amplifier.

It is well known in the art, as is illustrated by the aforementioned Tillman article, that the output from a nondestructive readout magnetic core is a substantially sinusoidal wave, the phase of the output wave being opposite for a stored binary 1 and a stored binary 0. Therefore, in prior nondestructive readout magnetic memories, some form of phase sensing or polarity-determining apparatus was required in order to determine the magnetic state of the memory cores.

In this invention, however, since a common sense winding links all the like order bits of the memory words and the reference word, the simultaneous interrogation of the selected memory word and the reference word will produce outputs from the memory bit and the reference bit that will add when the bits are in the same magnetic state and will cancel when the bits are in opposite magnetic states.

If it is assumed that the cores of the reference word are all set to the 1 magnetic state, then the presence of an output signal on the sense winding will indicate that the memory core is also in the 1 state, while the absence of an output signal on the sense winding will indicate that the memory core is in the 0 magnetic state.

It can be seen that since when both the memory core and the reference core are in the same magnetic state the output signals algebraically add, the output signal to noise ratio is improved.

It is one object of this invention, therefore, to provide a nondestructive readout magnetic memory.

Another object of this invention is to provide a nondestructive readout magnetic memory wherein the state of the memory cores is determined by the presence or absence of an output signal.

A further object of this invention is to provide a nondestructive readout magnetic memory having an improved signal to noise ratio.

Figure 1:
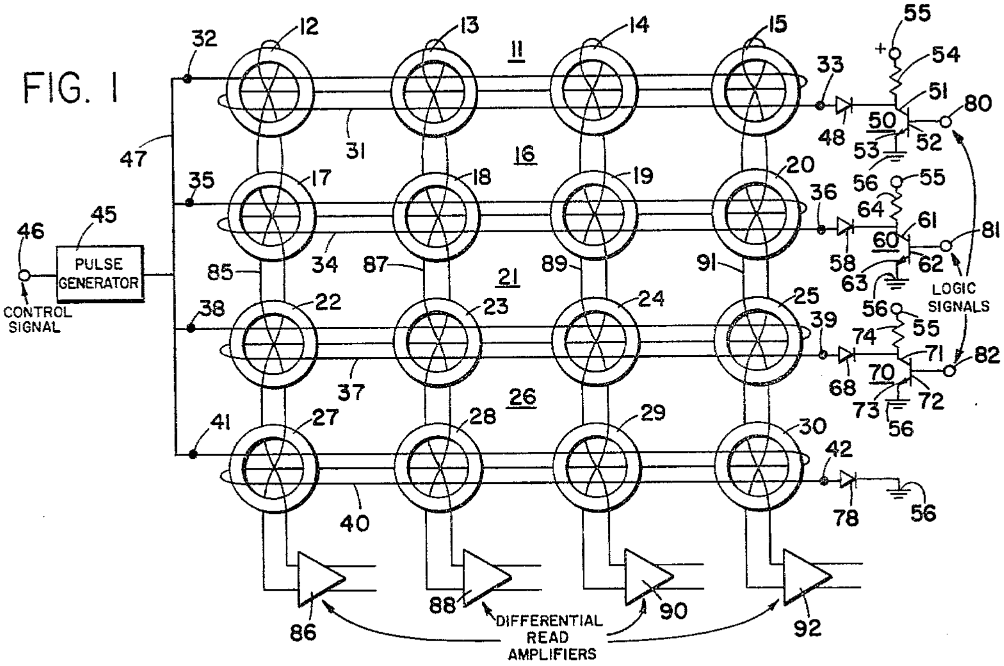
FIGURE 1 is a schematic representation of an embodiment of this invention.

These and other objects will become apparent to those skilled in the art upon consideration of the accompanying specification, claims and drawing of which:

*Structure of FIGURE 1*

Referring to FIGURE 1, there is shown a first memory word 11 comprising a magnetic core 12, a magnetic core 13, a magnetic core 14 and a magnetic core 15, a memory word 16 comprising a magnetic core 17, a magnetic core 18, a magnetic core 19 and a magnetic core 20, a memory word 21 comprising a magnetic core 22, a magnetic core 23, a magnetic core 24, and a magnetic core 25, and a reference word 26 comprising a magnetic core 27, a magnetic core 28, a magnetic core 29, and a magnetic core 30.

Magnetic cores 12, 13, 14 and 15 of memory word 11 are wrapped with a solenoid, or interrogate, winding 31 having end terminals 32 and 33, magnetic cores 17, 18, 19 and 20 of memory word 16 are wound with an interrogate winding 34 having end terminals 35 and 36, magnetic cores 22, 23, 24 and 25 of memory word 21 are wound with an interrogate winding 37 having end terminals 38 and 39 and magnetic cores 27, 28, 29 and 30 of reference word 26 are wound with an interrogate winding 40 having end terminals 41 and 42.

A pulse generator 45 is connected to a control signal input terminal 46. The output of pulse generator 45 is connected by means of a conductor 47 to terminals 32, 35, 38 and 41 of interrogate windings 31, 34, 37 and 40, respectively.

Terminal 33 of interrogate winding 31 is connected by means of a diode 48 to a collector 51 of a transistor 50. Transistor 50 further has a base 52 and an emitter 53. Collector 51 of transistor 50 is further connected by means of a resistor 54 to a source of energizing potential 55. Emitter 53 of transistor 50 is connected to ground 56.

Terminal 36 of interrogate winding 34 is connected by means of a diode 58 to a collector 61 of a transistor 60. Transistor 60 further has a base 62 and an emitter 63. Collector 61 of transistor 60 is further connected by means of a resistor 64 to the source of energizing potential 55. Emitter 63 of transistor 60 is connected to ground 56.

Terminal 39 of interrogate winding 37 is connected by means of a diode 68 to a collector 71 of a transistor 70. Transistor 70 further has a base 72 and an emitter 73. Collector 71 of transistor 70 is further connected by means of a resistor 74 to the source of energizing potential 55. Emitter 73 of transistor 70 is connected to ground 56.

Terminal 42 of interrogate winding 40 is connected by means of a diode 78 to ground 56.

Base electrodes 52, 62 and 72 of transistors 50, 60 and 70, respectively, are respectively connecte to logic input terminals 80, 81 and 82.

A sense, or readout, winding 85 links magnetic cores 12, 17, 22 and 27. The end terminals of sense winding 85 are connected to the input of a differential read amplifier 86. A sense winding 87 links magnetic cores 13, 18, 23 and 28. The end terminals of sense winding 87 are connected to the input of a differential read amplifier 88. A sense winding 89 links magnetic cores 14, 19, 24 and 29. The end terminals of sense winding 89 are connected to the input of a differential read amplifier 90. A sense winding 91 links magnetic cores 15, 20, 25 and 30. The end terminals of sense winding 91 are connected to the input of a differential read amplifier 92.

*Operation*

In considering the operation of the circuit of FIGURE 1, assume that an in-phase output signal represents a stored binary 1 while an out-of-phase output signal represents a stored binary 0. Assume further that all of the cores of the reference word 26 are set to the 1 state, and that core 12 of memory word 11 is in the 1 state, core 13 is in the 0 state, core 14 is in the 1 state and core 15 is in the 0 state. A binary 10 is therefore stored in memory word 11.

The method of writing this binary information into a nondestructive readout memory is well known in the art, and is explained in the above-referenced Tillman article. Therefore, a detailed discussion of the write operation will not be included in this specification.

Writing can be accomplished either by coincident current techniques or by multiple pulse method. With the former method, an additional winding (not shown), threaded through the cores in the same manner as the sense winding but at right angles, is required. Partial write currents are applied to this winding and to the sense winding, in order to switch the selected core.

In the multiple pulse method of writing, only the sense winding and the solenoid winding are required. A bias current is applied to the sense winding and multiple pulses on the solenoid winding can gradually diminish the magnetization of the core and then build it up in the opposite direction. The direction of magnetization is determined by the direction of current in the sense winding.

Assume that a positive logic signal is applied to logic terminal 80, and that negative logic signals are applied to logic terminals 81 and 82. The positive signals at terminal 80 will bias transistor 50 to its conducting state and a current will flow from the positive source 55 to resistor 54 and the collector-to-emitter electrodes of transistor 50 to ground, thereby dropping the potential at the collector 51 of transistor 50 to substantially ground potential. The negative logic signals at terminals 81 and 82 will bias transistors 60 and 70 to their nonconducting states.

Figure 2:
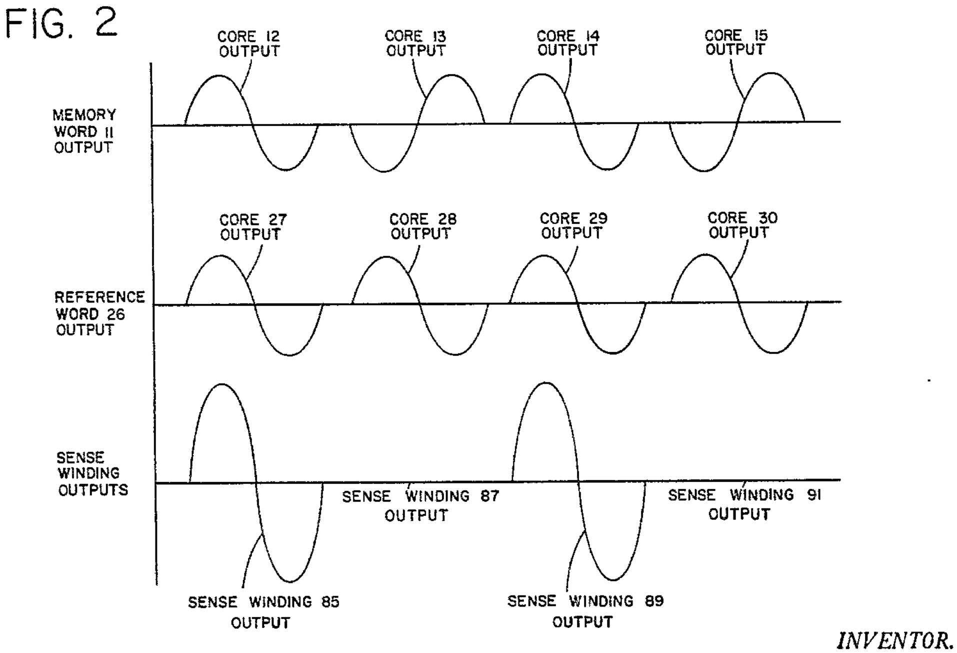
FIGURE 2 is an idealized representation of waveforms appearing at various points in the circuit of FIGURE 1.

A control signal at terminal 46 will trigger pulse generator 45 and a positive pulse will appear at the output. The pulse at the output of pulse generator 45 will be coupled by means of conductor 47 to terminals 32, 35 and 38 of the memory words 11, 16 and 21, respectively, and to terminal 41 of the interrogate winding of the reference word 26. Since the logic signals biased transistor 50 to its conducting state, the pulse at terminal 32 of interrogate winding 31 of memory word 11 will energize the interrogate winding and will interrogate cores 12, 13, 14 and 15 of memory word 11. The output of magnetic cores 12, 13, 14 and 15 of memory word 11 is shown in FIGURE 2. Memory words 16 and 21 will not be interrogated since the logic signals have biased transistors 60 and 70 to their non-conducting state and thereby have effectively open-circuited the interrogate windings 34 and 37 of memory words 16 and 21 respectively. Since the interrogate winding 40 of the reference word 26 is effectively connected directly across the output of pulse generator 45 the pulse output of generator 45 will simultaneously interrogate the reference word 26 and the memory word 11. The output of magnetic cores 27, 28, 29 and 30 of reference word 26 are shown in FIGURE 2.

As can be seen by referring to FIGURE 2, since core 12 of memory word 11 is in the same magnetic state as core 27 of the reference word 26, that is to say the 1 state, the outputs from cores 12 and 27 add in the common sense winding 85 and produce an output to the differential read amplifier 86. However, since core 13 of memory word 11 was in the 0 state while core 28 of the reference word 26 was in the 1 state, the outputs from cores 13 and 28 concel in the common sense winding 87 and therefore no signal is fed to the differential read amplifier 88. Similarly, the outputs of magnetic core 14 of memory word 11 and magnetic core 29 of reference word 26 add in the common sense winding 89 while the outputs of magnetic core 15 of memory word 11 and magnetic core 30 of reference word 26 cancel in the common sense winding 91.

From the above discussion it can be seen that a signal will be applied to the differential read amplifiers only when the state of the memory core is in the same state as the like order magnetic core of the reference word. Since it was assumed that all of the cores of the reference word were set to the 1 magnetic state, it can been seen that when there is a signal to the differential read amplifier the interrogated memory word was in the 1 state, and that when there is no signal to the differential read amplifiers the interrogated memory core was in the 0 state.

Stated in another way, the presence of a signal on the sense winding represents a binary 1 while the absence of a signal on the sense winding represents a binary 0.

It can be seen that since the outputs of the memory core and the reference core algebraically add, the output on the sense winding will be substantially twice the magnitude of the output of a single core and therefore the signal to noise ratio of the memory output is improved.

It is to be understood that while we have shown a specific embodiment of our invention, this is for the purpose of illustration only and our invention is to be limited solely by the scope of the appended claims.

What is claimed is:

1. A memory device comprising: a first plurality of nondestructive readout magnetic cores; a first interrogate winding linking each of said cores; a second plurality of nondestructive readout magnetic cores, each of said second plurality of cores being set to the same magnetic state; a second interrogate winding linking each of said second plurality of cores; means for simultaneously applying interrogate pulses to said first and second interrogate windings; and a plurality of sensing windings, each of said sensing windings respectively linking one of said first plurality of magnetic cores with one of said second plurality of magnetic cores.

2. A memory device comprising: a first nondestructive readout magnetic core; a first interrogate winding connected to said first core; a second nondestructive readout magnetic core, said second core always being in a reference magnetic state; a second interrogate winding connected to said second magnetic core; means adapted to simultaneously apply interrogate pulses to said first and second interrogate windings; and a sense winding connected to said first and second magnetic core.

3. A magnetic device comprising: a first plurality of nondestructive readout magnetic cores arranged to form a plurality of memory words, each word having a specific number of bits; a second plurality of nondestructive readout magnetic cores arranged to form a reference word having the same number of bits as said memory words, all of the cores of said reference word always being set to a first magnetic state; means connected to said reference word and said memory words to simultaneously interrogate said reference word and any one of said memory words; and a plurality of sensing means, one of said sensing means respectively linking the same numbered bit cores in each of said memory words and said reference word.

4. A memory device comprising: a plurality of word storage units, each of said word storage units comprising a plurality of nondestructive readout magnetic cores; a reference storage unit having the same number of nondestructive readout magnetic cores as each of said word storage units, all of the cores of said reference storage unit always being set to a first magnetic state; means connected to said storage units to simultaneously interrogate said reference storage unit and any selected one of said word storage units; and sensing means connected to said storage units whereby the outputs of each like order core of said reference storage unit and said selected word storage unit add when said cores are in the same magnetic state and cancel when said cores are in opposite magnetic states.

5. A memory device comprising: a plurality of word storage units, each of said word storage units comprising a plurality of nondestructive readout magnetic devices; a reference storage unit having a number of nondestructive readout magnetic devices, all of the magnetic devices of said reference storage unit always being set to a reference magnetic state; means connected to said storage units to simultaneously interrogate said reference storage unit and any selected one of said word storage units; and sensing means connected to said storage units whereby the outputs of each like order magnetic device of said reference storage unit and said selected word storage unit add when said magnetic devices are in the same magnetic state and cancel when said magnetic devices are in opposite magnetic states.

6. A magnetic device comprising: a first plurality of nondestructive readout magnetic devices arranged to form a plurality of memory words, each word having a specific number of bits; a second plurality of nondestructive readout magnetic devices arranged to form a reference word having the same number of bits as said memory words, all of the magnetic devices of said reference word always being set to a reference magnetic state; means connected to said reference word and said memory words to simultaneously interrogate said reference word and any selected one of said memory words, and sensing means connected to said memory words and said reference word whereby the outputs of each like ordered bit of said reference word and said selected memory word add when said bits are in the same magnetic state and cancel when said bits are in opposite magnetic states.

7. A memory device comprising: a first and a second nondestructive readout magnetic device, said second magnetic device always being in a reference magnetic state; means connected to said first and second magnetic devices to simultaneously interrogate said devices; and sensing means connected to said first and second magnetic devices whereby the outputs of said devices add when said devices are in the same magnetic state and cancel when said devices are in opposite magnetic states.

References Cited by the Examiner

UNITED STATES PATENTS 3,003,139 10/1961 Perkins ------------ 340—174

IRVING L. SRAGOW, *Primary Examiner.*